United States Patent
Blackburn et al.

(10) Patent No.: US 10,583,615 B2
(45) Date of Patent: Mar. 10, 2020

(54) DRY FIBROUS TAPE FOR MANUFACTURING PREFORM

(71) Applicant: Cytec Industries Inc., Woodland Park, NJ (US)

(72) Inventors: Robert Blackburn, Hull (GB); Samuel Jestyn Hill, Wrexham (GB); Dominique Ponsolle, Winoma, MN (US); Carmelo Luca Restuccia, Chester (GB)

(73) Assignee: Cytec Industries Inc., Woodland Park, NJ (US)

( * ) Notice: Subject to any disclaimer, the term of this patent is extended or adjusted under 35 U.S.C. 154(b) by 547 days.

(21) Appl. No.: 14/750,327

(22) Filed: Jun. 25, 2015

(65) Prior Publication Data

US 2015/0375461 A1    Dec. 31, 2015

Related U.S. Application Data

(60) Provisional application No. 62/018,857, filed on Jun. 30, 2014.

(51) Int. Cl.
  *B29B 11/16*    (2006.01)
  *B29C 65/48*    (2006.01)
  (Continued)

(52) U.S. Cl.
  CPC ............ *B29C 70/083* (2013.01); *B29B 11/16* (2013.01); *B29B 15/122* (2013.01);
  (Continued)

(58) Field of Classification Search
  CPC ..... B29B 11/16; B29B 15/122; B29C 65/481;
  B29C 65/4815; B29C 65/482; B29C 65/4835; B29C 65/486; B29C 70/083; B29C 70/20; B29C 70/386; B29C 70/443; B29C 70/48; B29C 2793/0036; B32B 5/022; B32B 5/26; B32B 37/16; B32B 2037/1253; B32B 2037/1276; B32B 2038/045; B32B 2260/021; B32B 2260/046; B32B 2262/106; C08L 63/00;
  (Continued)

(56) References Cited

U.S. PATENT DOCUMENTS 5,935,508 A   8/1999  Fernyhough et al.
7,137,182 B2 * 11/2006 Nelson ................. B29C 70/202
                                           156/253

(Continued)

FOREIGN PATENT DOCUMENTS

WO          99/21697 A1    5/1999
WO       2013096377 A2    6/2013
WO    WO-2014076433 A1 *  5/2014  ............ B29C 70/38

*Primary Examiner* — Michael A Tolin
(74) *Attorney, Agent, or Firm* — Thi Dang

(57) ABSTRACT

A dry, fibrous tape for use in an automated placement process such as ATL or AFP and a preform produced therefrom. The preform is configured for resin infusion. The tape contains a layer of unidirectional fibers, at least one nonwoven veil bonded to one side of the fiber layer, and at least binding materials present within the tape. The preform produced from laying down such tape exhibits a low-bulk property that is close to the final thickness of the cured fiber-reinforced resin article and no further consolidation or compaction is required.

5 Claims, 2 Drawing Sheets

(51) Int. Cl.
  B29C 70/38    (2006.01)
  B29C 70/42    (2006.01)
  B32B 5/26     (2006.01)
  B29C 70/08    (2006.01)
  B32B 5/02     (2006.01)
  B32B 5/18     (2006.01)
  B32B 5/12     (2006.01)
  B29C 70/48    (2006.01)
  D04H 3/04     (2012.01)
  D04H 1/593    (2012.01)
  B29C 70/44    (2006.01)
  B29B 15/12    (2006.01)
  B29K 105/08   (2006.01)
  B29K 63/00    (2006.01)
  B29K 75/00    (2006.01)
  B29K 71/00    (2006.01)
  B29K 81/00    (2006.01)
  B29K 105/00   (2006.01)
  B29K 307/04   (2006.01)
  B29K 77/00    (2006.01)
  D04H 1/587    (2012.01)
  D04H 1/64     (2012.01)
  D04H 1/74     (2006.01)
  D04H 3/12     (2006.01)
  D04H 1/58     (2012.01)
  B32B 37/12    (2006.01)
  B32B 38/04    (2006.01)

(52) U.S. Cl.
  CPC ........ *B29C 65/4835* (2013.01); *B29C 70/386* (2013.01); *B29C 70/443* (2013.01); *B29C 70/48* (2013.01); *B32B 5/022* (2013.01); *B32B 5/024* (2013.01); *B32B 5/12* (2013.01); *B32B 5/18* (2013.01); *B32B 5/26* (2013.01); *D04H 1/593* (2013.01); *D04H 3/04* (2013.01); *B29C 2793/0027* (2013.01); *B29C 2793/0036* (2013.01); *B29K 2063/00* (2013.01); *B29K 2071/00* (2013.01); *B29K 2075/00* (2013.01); *B29K 2077/00* (2013.01); *B29K 2081/06* (2013.01); *B29K 2105/0085* (2013.01); *B29K 2105/0881* (2013.01); *B29K 2307/04* (2013.01); *B32B 2037/1276* (2013.01); *B32B 2038/045* (2013.01); *B32B 2260/021* (2013.01); *B32B 2260/046* (2013.01); *B32B 2262/106* (2013.01); *B32B 2305/026* (2013.01); *B32B 2305/076* (2013.01); *C08L 2201/50* (2013.01); *D04H 1/58* (2013.01); *D04H 1/587* (2013.01); *D04H 1/64* (2013.01); *D04H 1/74* (2013.01); *D04H 3/12* (2013.01)

(58) Field of Classification Search
  CPC .. C08L 81/06; C08L 2201/50; C08L 2201/52; C08L 2201/54; C09J 163/00; C09J 181/06
  See application file for complete search history.

(56) References Cited

U.S. PATENT DOCUMENTS

| | | | |
|---|---|---|---|
| 2004/0030061 A1* | 2/2004 | McGrail | C08J 5/24 525/537 |
| 2004/0241415 A1 | 12/2004 | Wadahara et al. | |
| 2005/0274446 A1* | 12/2005 | Evans | B29C 70/386 156/64 |
| 2006/0048881 A1 | 3/2006 | Evans et al. | |
| 2007/0196636 A1 | 8/2007 | Schneider et al. | |
| 2008/0289743 A1 | 11/2008 | Tsotsis | |
| 2012/0015167 A1 | 1/2012 | Beraud et al. | |
| 2013/0108823 A1 | 5/2013 | Beraud et al. | |
| 2013/0328236 A1* | 12/2013 | Yamamoto | B29C 70/48 264/257 |
| 2014/0175709 A1 | 6/2014 | Blackburn et al. | |
| 2014/0179187 A1* | 6/2014 | Restuccia | C08L 63/00 442/149 |
| 2014/0322511 A1 | 10/2014 | Beraud et al. | |
| 2015/0015135 A1 | 1/2015 | Beraud et al. | |
| 2015/0290883 A1* | 10/2015 | Beraud | B29C 70/38 428/172 |

* cited by examiner

DRY FIBROUS TAPE FOR MANUFACTURING PREFORM

BACKGROUND

Three-dimensional polymer composite parts can be manufactured using different methods, one of which is liquid molding. Resin Transfer Molding (RTM) and VARTM are examples of manufacturing processes that involve injecting a liquid resin into a fibrous preform. During the RTM process, the preform is placed into an enclosed mold cavity, and the resin is injected into the cavity under pressure. The mold with the preform is often put under vacuum so that the vacuum removes all the entrapped air in the preform and speeds up the RTM process. Once the liquid resin fills the mold cavity, the resin is cured, resulting in the formation of a composite part. VARTM is similar to RTM except that a single-sided tool is normally used with vacuum bagging, and vacuum pulls the liquid resin into the preform. These techniques are well suited for the manufacturing of very complex-shape parts, in many cases at reasonable production rates. The fiber architecture, permeability of the preform and the fabric crimps, resin viscosity, and temperature of operation have an influence on the wetting of the fabric.

To prepare the preform, dry layers of unidirectional reinforcing fibers or woven fabrics are laid up similarly to the way resin-impregnated prepregs are laid up. It would be desirable to employ Automated Tape Laying (ATL) and Automated Fiber Placement (AFP) for the lay-up of the preform to reduce costs. However, the technological challenges connected to the manufacture of dry, narrow-width, fibrous products suitable for automated placement processes, such as ATL and AFP, requires further development.

SUMMARY

Disclosed herein is a dry, flat tape for use in the fabrication of a fibrous preform by an automated placement process such as ATL or AFP. The tape contains a layer of unidirectional fibers, at least one nonwoven veil bonded to one side of the fiber layer, and at least one binding material present within the tape. The preform produced from laying down a plurality of such tape exhibits a low-bulk property that is close to the final thickness of the cured fiber-reinforced resin article and no further consolidation or compaction is required.

DETAILED DESCRIPTION

In the manufacturing of fiber-reinforced polymer composites, dry fiber materials offer the user an increased level of control and manipulation in the positioning and orientation of the fibers due to the inherent lack of resin when compared to pre-impregnated materials which have been impregnated with a resin. However, without the ability to fix the fibres to their desired position significant problems in preform quality and consistency can be expected. This is particularly prevalent in the situations where the preforms require handling to be combined in a dry assembly of a master preform for subsequent infusion or where preforms require other post-consolidation operations such as near-net shape trimming. Significant challenges exist in the use of dry fiber materials for laying up a preform if poor compaction behaviour of the fiber materials is observed causing significant preform bulk increase and loose preform issues. Consequently, subsequent preform handling becomes more difficult as there is a risk for the plies to separate while excess of bulk will cause the preforms to be oversized presenting a difficulty to fit appropriate tooling and may cause performance impediments to the final composite due to a low ratio of fiber to resin after injection and cure.

This excess of bulk has been reported by manufacturers of composite materials where the preforms have incorporated a thermoplastic interleaf veil. It also predominantly impacts preforms with thickness higher than 4 mm.

Figure 1:
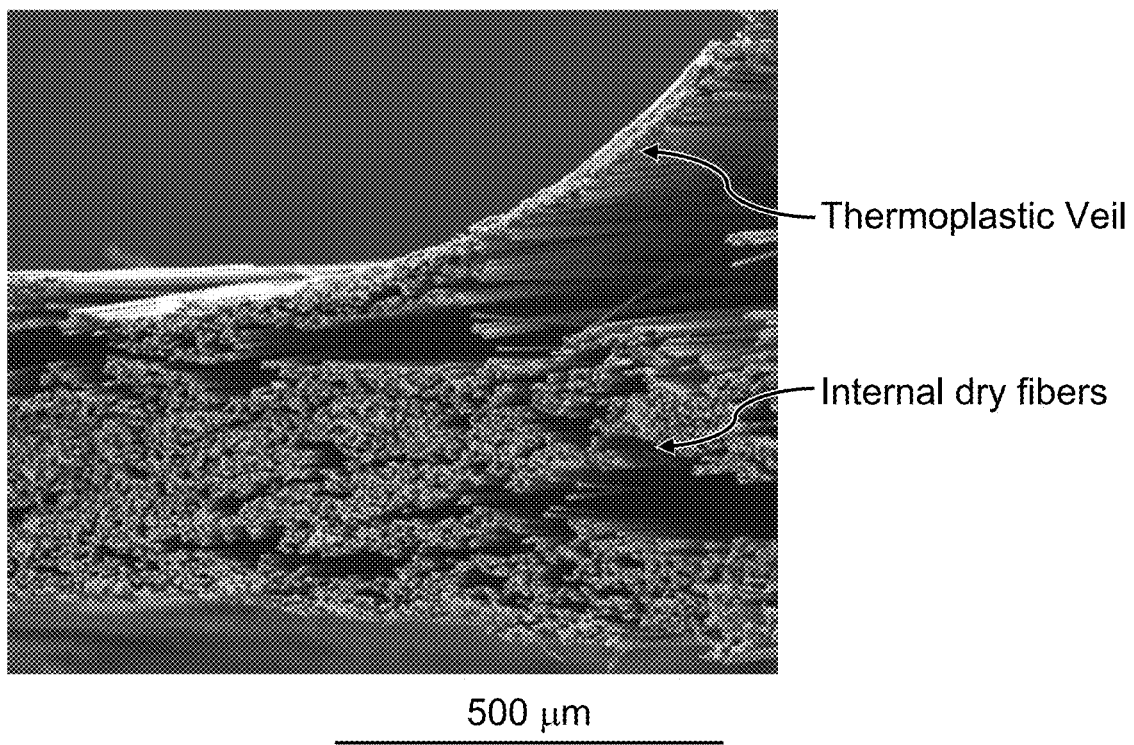
FIG. 1 is a partial view of a dry tape where the outer thermoplastic veil holds the outer fibers together but the internal dry fibers are free to move.

One solution to the above issue is to provide a dry tape configuration where a nonwoven thermoplastic veil is laminated to each face of a tape of unidirectional fibers in order to encapsulate the tape and to allow a mean for the fiber tows to be secured in place with heat and pressure. However, it has been found that dry tapes constructed in this manner typically exhibit poor thickness control in the presence of thickness variability and bulk. FIG. 1 shows the loose-fiber issue related to this type of tape—the thermoplastic veil holds the outer fibers together but the internal dry fibers are free to move.

The present disclosure provides a solution to the increased thickness/bulkiness issue associated with the conventional dry, unidirectional fiber tapes. One aspect of the present disclosure is to provide a dry fiber tape configuration to be used in automated placement whereby the preform produced by laying up the tapes exhibits a low-bulk property that is close to the final thickness of the cured fiber-reinforced resin article and no further consolidation or compaction is required.

One aspect of the present disclosure is directed to a dry, flat tape which includes a layer of unidirectional fibers aligned parallel to each other, a nonwoven veil bonded to at least one side of the layer of unidirectional fibers, a first binding material (also referred herein as "binder") distributed on each side of the layer of unidirectional fibers and penetrated through portions of the nonwoven veil, or distributed throughout the tape, including in spaces between the unidirectional fibers and on portions of the veil.

According to another embodiment, a first binder is distributed on each side of the layer of unidirectional fibers and penetrated through portions of the nonwoven veil, and a second binder (different from the first binder) is distributed throughout the tape, including in spaces between the unidirectional fibers and on portions of the veil.

In some embodiments, two nonwoven veils of thermoplastic fibers are bonded to opposite sides of the layer of unidirectional fibers.

According to one embodiment, the nonwoven veil comprises fibers which may include thermoplastic fibers and/or carbon fibers. These fibers can be randomly oriented or not depending on the veil manufacturing process conditions. The fiber length may vary from ⅛ in (0.32 cm) to 2 in (5.08 cm) long. The areal weight of the nonwoven veil in this embodiment is preferably less than 10 grams per square meter (gsm).

According to another embodiment, the nonwoven veil is in the form of a thermoplastic grid. The thermoplastic grids may be fabricated by be extruding a thermoplastic material to form an engineered network of orientations or controlled pattern in which the thermoplastic material is laid down. These orientations may be 0/±60 for instance within a same grid. A supplier of this type of grid is Protechnic (France). The thermoplastic grid described herein may have an areal weight in the range of 2-50 gsm, preferably 2-20 gsm, more preferably 2-10 gsm.

According to another embodiment, the nonwoven veil is in the form of a porous, thermoplastic membrane with a controlled pattern of apertures. As examples, the porous membrane may be formed by mechanically piercing a continuous thermoplastic film or formed by conventional casting processes. Such membrane may comprise a plurality of micron-sized apertures of varying shapes so as to provide an open, liquid-permeable structure. The shape and density of the apertures can be tailored to provide the desired physical characteristics. More specifically, the apertures are configured to enable the flow of resin used in subsequent resin infusion to pass through. The apertures of the porous membrane may take a variety of shapes. Non-limiting examples include holes/openings having cross-sections that are circular, oval, square, triangular, hexagonal, etc. More than one pattern may be present in a membrane. The porous membrane described herein may have an areal weight in the range of 2-50 gsm, preferably 2-20 gsm, more preferably 2-10 gsm. In some embodiments, the nonwoven veil is composed of carbon fibers. In other embodiments, the nonwoven veil is composed of one or more types of thermoplastic fibers. Alternatively, the veil may contain a hybrid mix of both inorganic fibers and polymeric fibers. For nonwoven veils in the form of thermoplastic fibers or porous membrane, the thermoplastic material may be selected from polyamides, thermoplastic polyamides, aliphatic polyamides, cycloaliphatic polyamides, polyphthalamides, polyamidoimides, aromatic polyamides, polyimides, polyetherimides, polyesters, polyphenyleneoxides, polyurethanes, thermoplastic polyurethanes, polyacetals, polyolefins, thermoplastic polyolefins, polyethersulfones, polyetherethersulfones, polysulfones, polyphenylene sulfone, polyetheretherketones, polyetherketoneketone, poly(phenylenesulfide) thermoplastic polyimides, liquid crystal polymers (LCP), phenoxys, acrylics, acrylates, mixtures and copolymers thereof.

The openness of the nonwoven veil (whether in the form of random fibers, grid or porous membrane) is important to ease air removal and resin flow during the resin injection or infusion process.

Neither the first binder nor the second binder discussed above forms a continuous layer. If the binders form a continuous film at the surface of the dry tape, this may prevent the resin from satisfactorily penetrating through the thickness of the preform during the resin injection cycle of liquid molding processes such as RTM or VARTM. As such, the tape is porous and permeable to liquid resins to be used in liquid molding.

The total content of binder materials in the dry tape is about 15% or less by weight, e.g. 0.1 and 15% by weight, based on the total weight of the dry tape, and the structural fibers is the major component of the fibrous material, e.g. greater than 80% by weight based on the total weight of the dry tape.

The tapes disclosed herein may have a width of up to 50 in (1.3 m). According to one embodiment, each tape has a width of 0.1 cm to 61 cm, a length that is at least 10 times its width, and a thickness of approximately 75 µm to 300 µm, including 100 µm to 250 µm.

According to one embodiment, the method for manufacturing the dry tape includes: applying the first binding material, in particulate form, to a dry fiber web of spread unidirectional, high-strength fibers (e.g. carbon fibers); bonding a nonwoven veil (e.g. of carbon fibers or thermoplastic fibers) to at least one side of the fiber web; applying a second binding material, in the form of a liquid composition, to the unidirectional fibers/veil laminate, e.g. by dip coating; and drying the binder-treated laminate in an oven. The first binding material may be in the form of particles when it is applied to the unidirectional fibers. In an alternative embodiment, particles of the first binding material are applied to the nonwoven veil and the veil is then bonded to the fiber web. The dried, binder-treated laminate is then slit into narrow-width tapes that are suitable for ATL/AFP, and optionally, the slit tapes are wound onto spools.

According to another embodiment, the method for manufacturing the dry tape includes: applying the first binding material, in a liquid form, to a dry fiber web of spread unidirectional high-strength fibers such as carbon fibers, e.g. by dip coating or spraying; and drying the binder-treated unidirectional fibers in an oven; bonding a nonwoven veil (e.g. of carbon fibers or thermoplastic fibers) to at least one side of the fiber web; applying a second binding material, in the form of a liquid composition, to the unidirectional fibers/veil laminate, e.g. by dip coating or spraying; and drying the binder-treated laminate in an oven. The first binding material may be in the form of a water emulsion when it is applied to the unidirectional fibers. In an alternative embodiment, the first binding material is either used in the fabrication of or applied to the nonwoven veil and the veil is then bonded to the fiber web. The dried, binder-treated laminate is then slit into narrow-width tapes that are suitable for ATL/AFP, and optionally, the slit tapes are wound onto spools.

According to yet another embodiment the first and second binders have been combined into one binder, in a liquid form. Then, the method for manufacturing the dry tape includes: applying the combined binders, in a liquid form, to a dry fiber web of spread unidirectional high-strength fibers such as carbon fibers, e.g. by dip coating or spraying; and drying the binder-treated unidirectional fibers in an oven; bonding a nonwoven veil (e.g. of carbon fibers or thermoplastic fibers) to at least one side of the fiber web. The dried, binder-treated laminate is then slit into narrow-width tapes that are suitable for ATL/AFP, and optionally, the slit tapes are wound onto spools.

A preform for use in a liquid molding process may be prepared by laying down a plurality of dry tapes via an automated placement process such as ATL or AFP. A bulk test has been devised to determine the tape's effect on bulk. It has been discovered that, when the preform is heated at a temperature of 165° C. for 30 sec, the preform exhibits a low-bulk property, whereby the preform thickness ($T_2$) after heating is reduced by 1% to 15% relative to the preform's initial thickness $T_1$ (or $T_2$=0.85 $T_1$ to 0.99 $T_1$).

The preform disclosed above may be used in the manufacture of a composite structure. The composite manufacturing method may include:

a) laying down a plurality of the aforementioned dry tapes by an automated placement process (ATL or AFP) to form a multilayered preform, wherein the consolidated preform has an initial thickness $T_1$;

b) infusing the preform with a liquid resin in a liquid molding process;

c) curing the resin-infused preform to form a composite structure having a thickness $T_2$.

The preform exhibits a low-bulk property upon heating as determined by the heating and forming process of the automated placement process, and the cured thickness of the composite structure, $T_2$, is reduced by 0% to 10% of the preform thickness $T_1$ (or $0.90\ T_1 \leq T_2 \leq 1.00\ T_1$), and no further consolidation is required following the tape laying process.

Debulking of the preform prior to curing is minimal (or not necessary) because debulking occurs during the ATL/AFP process as the binder-containing tapes are being laid down to form the preform.

In one embodiment, the first binding material is a solid at a temperature of up to 50° C.), has a softening point at a temperature in the range of 65° C. to 125° C., and comprises a blend of epoxy resin and thermoplastic polymer, but is void of any catalyst or cross-linking agent which is active above 65° C. The thermoplastic polymer in the first binding material may be a polyarylsulphone polymer comprising ether-linked repeating units and optionally thioether-linked repeating units, the units being selected from:

-(Ph-A-Ph)- and optionally

-(Ph)$_a$- wherein A is CO or $SO_2$, Ph is phenylene, n=1 to 2 and can be fractional, a=1 to 4 and can be fractional, provided that when a exceeds 1, the phenylenes are linked linearly through a single chemical bond or a divalent group other than —CO— or —$SO_2$—, or are fused together directly or via a cyclic moiety selected from the group consisting of an acid alkyl group, a (hetero) aromatic, a cyclic ketone, a cyclic amide, an imide, a cyclic imine and combinations thereof. In an embodiment, the thermoplastic polymer is a PES-PEES copolymer. The method for making this solid binding material may be found in U.S. Pat. No. 8,927,662, assigned to Cytec Technology Corp., the content of which is incorporated herein by reference in its entirety.

According to another embodiment, the first binding material is an aqueous binder dispersion containing (a) one or more multifunctional epoxy resins, (b) at least one thermoplastic polymer, (c) one or more surfactants selected from anionic surfactants and nonionic surfactants, (d) water, and preferably, is essentially free of organic solvents. Optional additives such as organic or inorganic fillers and a defoamer may also be included in the binder composition.

The thermoplastic polymer in this embodiment is soluble in a thermoset matrix resin upon curing of the matrix resin. An example is a polyarylsulphone comprised of ether-linked repeating units and optionally thioether-linked repeating units as discussed above.

The polyarylsulphone may contain repeating units of -(PhSO$_2$Ph)-, wherein the -(PhSO$_2$Ph)-unit is present in the polyarylsulphone in such a proportion that on average at least two of said unit -(PhSO$_2$Ph)n-are in sequence in each polymer chain present.

Preferably, the polyarylsulphone is a copolymer containing the following units:

X-Ph-SO$_2$-Ph-X-PhSO$_2$Ph ("PES") and (I)

X-(Ph)$_a$-X-PhSO$_2$Ph ("PEES") (II)

wherein X is O or S and may differ from unit to unit, and a is 1-4.

The thermoplastic polymer may have a molecular weight in the range of 2,000 to 30,000 as measured by high pressure size-exclusion chromatography (HPSEC), and a glass transition temperature ($T_g$) of greater than 150° C. as measured by Differential scanning calorimetry (DSC).

The one or more surfactants in this embodiment is selected from:
a) nonionic surfactant which is mono or multi-functional block or graft block copolymers comprising hydrophilic and hydrophobic blocks;
b) anionic surfactant which is represented by the following formula:

A-R wherein R is an alkyl, aryl, aryl-alkyl, or an alkylene chain having 4-50 carbon atoms (C4 to C50); and A is lithium, sodium, potassium, ammonium, quaternary ammonium amine salt of a carboxylic-, or sulfonic-, or phosphoric acid group; and
c) a combination of nonionic surfactant and anionic surfactant.

The nonionic surfactant includes a backbone moiety, and the hydrophobic and hydrophilic blocks are part of the backbone or project substantially from the backbone moiety to form grafts, or combination thereof.

Preferably, the nonionic surfactant is selected from the following compounds:
(a) polyoxamer represented by the following formula:

(EO)x-(PO)y-(EO)z (III)

wherein x, y, z=integers or fractions provided that the ratio of (x+z) to y is 1.32 or higher and the content of ethylene oxide is in the range of 50%-99% by weight, and
wherein the polyoxamer has a number average molecular weight (Mn) in the range of 1000 g/mol-100,000 g/mol as measured by gel permeation chromatography (GPC); and
(b) polyoxamine

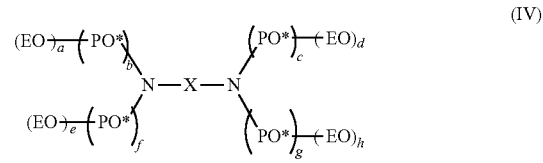

(IV)

wherein a, b, c, d, e, f, g, h are integers or fractions, and the polyoxamine has a number average molecular weight in the range of 1000 g/mol-100,000 g/mol.

The liquid binder composition discussed above may further include a crosslinker selected from aminoplasts, phenolics, azlactones, aziridines, and blocked isocyanates. The binder composition is a polymer emulsion having a solid content of 40%-70%, and particle size distribution in the range of 50 nm-10000 nm. The particle size distribution may be determined by dynamic light scattering. The method for making this liquid binder composition may be found in U.S. Pub. No. 2014/0179187, assigned to Cytec Technology Corp., the content of which is incorporated herein by reference in its entirety.

The liquid binder composition, as polymer emulsion, is applied to coat and infiltrate the fibers in the tape. Water is then evaporated according to a controlled time/temperature profile to achieve the desired physical properties balance.

The liquid binder composition is applied so that it penetrates through the structure of the resulting tape.

In embodiments where two different binding materials are applied, the first binding material is as described above and the second binding material may be a partially or fully cross-linked copolymer of polyhydroxyether and polyurethane. During the manufacturing of the dry tape, the second binding material may be applied as a liquid binder composition that is based on a water-borne dispersion containing: (i) a copolymer of polyhydroxyether and polyurethane, (ii) a cross-linker; and optionally, (iii) a catalyst. The cross-linker may be an aminoplast cross-linker, for example, methoxyalkyl melamine class of aminoplast cross-linkers. The catalyst may include, but are not limited to, proton donating acids such as carboxylic, phosphoric, alkyl acid phosphates, sulfonic, di-sulfonic acids and/or Lewis acids such as aluminum chloride, bromide or halide, ferric halide, boron tri-halides, and many others in both categories as is well known to one skilled in the art.

According to another embodiment, the second binding material is a polyurethane or a modified polyurethane polymer. During the manufacturing of the dry tape, the second binding material may be applied as a liquid binder composition that is based on a water-borne dispersion containing: (i) a polyurethane; and (ii) optionally, a cross-linker. As such, the manufactured tape may contain a non-crosslinked, partially or fully crosslinked polyurethane polymer.

The polyurethane can be synthesized by reacting a polyisocyanate with one or more polyols having a number average molar mass ($M_n$) of at least 400 g/mol (as measured by GPC), selected from a group consisting of aliphatic or aromatic polyether polyols and polyester polyols and optionally:
 a compound capable of forming anions and with at least two groups that are reactive towards isocyanate groups;
  a low molar mass polyol with $M_n$ of from 60 to 400 g/mol;
  a combination thereof.

Suitable polyisocyanates (which means compounds having a plurality of isocyanate groups) for preparing the polyurethane include any organic polyisocyanate, preferably monomeric diisocyanates. Especially preferred are polyisocyanates, especially diisocyanates, having aliphatically- and/or cycloaliphatically-bound isocyanate groups, although polyisocyanates having aromatically-bound isocyanate groups are not excluded and may also be used.

Examples of suitable polyisocyanates which may be used include ethylene diisocyanate, 1,4-tetramethylene diisocyanate, 1,6-hexamethylene diisocyanate, 2,4,4-trimethyl-1,6-hexamethylene diisocyanate, 1,12-dodecanediisocyanate, cyclobutane-1,3-diisocyanate, cyclohexane-1,3- and/or -1,4-diisocyanate, 1-isocyanato-2-isocyanatomethyl cyclopentane, 1-isocyanato-3,3,5-trimethyl-5-isocyanatomethyl cyclohexane(isophorone diisocyanate or IPDI), 2,4- and/or 2,6-hexahydrotoluylene diisocyanate, 2,4'- and/or 4,4'-dicyclohexylmethane diisocyanate, a,a,a',a-tetramethyl-1,3- and/or -1,4-xylylene diisocyanate, 1,3- and 1,4-xylylene diisocyanate, 1-isocyanato-1-methyl-4(3)-isocyanatomethylcyclohexane, 1,3- and 1,4-phenylene diisocyanate, 2,4- and/or 2,6-toluylene diisocyanate, diphenyl methane-2,4'- and/or -4,4'-diisocyanate, naphthalene-1,5-diisocyanate, triphenylmethane-4,4',4"-triisocyanate, polyphenyl polymethylene polyisocyanates of the type obtained by condensing aniline with formaldehyde followed by phosgenation, and mixtures of the above-mentioned polyisocyanates.

Suitable polyols preferably have a number average molar mass ($M_n$) of from 400 g/mol to 5000 g/mol. Examples of suitable polyols include aliphatic polyether polyols such as polyoxyethylene glycol, polyoxypropylene glycol, or mixed polymers of such units, polyester polyols obtainable by polycondensation of diols or polyols with dicarboxylic or polycarboxylic acids, such polyester polyols including polyethylene adipate, mixed polyesters derived from ethylene glycol, hexane diol, trimethylol propane, adipic and terephthalic acid, etc. Other building blocks that may constitute, or be included in, such polyester polyols are hydroxycarboxylic acids such as hydroxybutyric or hydroxy caproic acid or their lactones.

Suitable aromatic polyether polyols are epoxy resins or phenoxy resins, or mixtures thereof.

Examples of compounds capable of forming anions include polyols, particularly diols, and polyamines, particularly diamines, or hydroxyamines, that carry from 1 to 3 carboxyl or sulfonic acid groups per molecule.

Examples of compounds capable of forming anions include polyols, particularly diols, and polyamines, particularly diamines, or hydroxyamines, that carry from 1 to 3 carboxyl or sulfonic acid groups per molecule.

Examples of carboxylate containing compounds of this composition include the reaction of isocyanated terminated polyol pre-polymers (obtained by the reaction of excess di-isocyantate with hydroxyl containing per-polymers) with hydroxyl containing carboxylic acids. Examples of cationic terminated compounds of this invention include the quarternary ammonium or phosphonium prepolymers. Such cationic compositions can be prepared by the reaction of tert-amine containing alcohols with above said isocyanated terminated pre-polymers followed by reaction with a quarterizing agent such as dimethyl sulfate or an alkyl halide as is known by one skilled in the art. Examples of low molar mass polyols with a molar mass of preferably from 60 to 400 include ethylene glycol, diethylene glycol, 1,4-butane diol, cyclo-hexane diol and any other diol know to people skilled in the art.

Suitable cross-linkers for polyurethanes may include, but are not limited to, diisocyanate or polyisocyanate cross-linkers, for example, an aliphatic or aromatic polyisocyanate cross-linkers.

Examples of polyisocynate crosslinkers are modified aliphatic polyisocyanate commercialized with the trade designation of Perapret Booster XLR by BASF or with the trade name of Desmodur® N by Bayer. Examples of aromatic polyisocyanate are toluene diisocyanate (TDI) based polyisocyanate commercialized by Bayer with the trade designation of Desmodur® L.

In yet another embodiment, the second binding material includes an epoxy resin or a modified epoxy resin.

During the manufacturing of the dry tape, the second binding material may be applied as a liquid binder composition that is based on a water-borne dispersion containing: (i) an epoxy resin; and (ii) optionally a cross-linker. As such, the manufactured tape may contain a non-crosslinked, partially or fully crosslinked epoxy resin.

Examples of epoxy resins are those having at least two epoxide groups per molecule, and has preferably a polyether structure which in turn has moieties derived from 1,2,3-trihydroxypropane and moieties derived from aromatic dihydroxy or polyhydroxy compounds. Generally, the polyepoxides have on average at least two epoxy groups per molecule. Said epoxy compounds may be aliphatic, cycloaliphatic, aromatic or heterocyclic and may also contain hydroxyl groups.

Preferably, these epoxy compounds are polyglycidyl ethers based on polyhydric, preferably dihydric alcohols, polyhydric, preferably dihydric phenols, hydrogenation products of said phenols, novolacs and/or aniline.

As polyhydric phenols, they may include, for example, resorcinol, hydroquinone, 2,2-bis(4-hydroxyphenyl)propane (bisphenol A), the isomeric mixtures of dihydroxydiphenyl-methane (bisphenol F), tetrabromobisphenol A, 4,4'-dihydroxydiphenylcyclohexane, 4,4'-di-hydroxy-3,3'-dimethyl-diphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,S-dihydroxynaphthalene, tris(4-hydroxyphenyl)methane, bis(4-hydroxyphenyl) ether, and bis(4-hydroxyphenyl)sulfone, and also the chlorination and bromination products of the abovementioned compounds. Bisphenol A is particularly preferred.

Polyglycidyl ethers of polyhydric alcohols are also suitable as epoxy resins. As examples of such polyhydric alcohols, they may include ethylene glycol, diethylene glycol, triethylene glycol, 1,2-propylene glycol, polyoxypropylene glycols (with from two to ten 1,2-propyleneoxy units), 1,3-propylene glycol, 1,4-butylene glycol, 1,S-pentanediol, 1,6-hexanediol, 1,2,6-hexanetriol, glycerol, and bis(4-hydroxycyclohexy 1)-2,2-propane.

Suitable resins also include aromatic glycidylamine epoxy resins such as condensates of aromatic polyamines such as aniline, diaminodiphenylmethane, o-,p-,m-amino-phenol, 2-amino-p-cresol, 6-amino-p-cresol, o-,p-,m-xylylenediamine, o-,m-,p-chloroaniline, o-,m-,p-bromoaniline, o-,m-,p-iodoaniline, bisaminomethylcyclohexane with epichlorohydrin.

It is also possible to use polyglycidyl esters of polycarboxylic acids which are obtained by a reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerised linolenic acid. Examples are diglycidyl adipate, diglycidyl phthalate and diglycidyl hexahydrophthalate, ester epoxy resins such as copolymers of glycidyl(meth)acryrate with an ethylenically unsaturated monomer, e. g. acrylonitril, hydroxy(meth)acrylate, N,N'-dimethylaminoethyl(meth)acrylate; epoxy resins such as epoxidate soybean oil. A detailed enumeration of the suitable epoxy compounds can be found on pages 1-1 to 3-20 of Henry's Handbook of Epoxy Resins published by McGraw-Hili Brook Company in 1967, and in Lee and Neville "Handbook of Epoxy Resins", 1967, Chapter 2. Mixtures of several epoxy compounds mentioned are also contemplated.

Suitable crosslinkers for the epoxy resins may include, but are not limited to, amino compounds having a molecular weight up to 500 per amino group, for example an aromatic amine or a guanidine derivative. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA; Lonza); 4,4'methylenebis-(3-chloro, 2,6-diethyl)-aniline (MCDEA; Lonza); 4,4'methylenebis-(2,6-diisopropyl)-aniline (M-DIPA; Lonza); 3,5-diethyl toluene-2,4/2,6-diamine (D-ETDA 80; Lonza); 4,4'methylenebis-(2-isopropyl-6-methyl)-aniline (M-MIPA; Lonza); 4-chlorophenyl-N,N-dimethyl-urea (e.g. Monuron); 3,4-dichlorophenyl-N,N-dimethyl-urea (e.g. Diuron™) and dicyanodiamide (Amicure™ CG 1200; Pacific Anchor Chemical). Bisphenol chain extenders, such as bisphenol-S or thiodiphenol, are also useful as curing agents for epoxy resins. Suitable curing agents also include: i) anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, or trimellitic anhydride; ii) amino resin crosslinkers such as methylated and butylated melamines, alkylated and imino mixed ether melamines, alkylated ureas, benzoguanamines and glycourils; iii) phenolics; iv) azlactones; and v) aziridines.

One or more catalyst(s) may also be used to accelerate the curing reaction. Suitable catalysts are well known in the art and include strong acids such as super-acids and blocked versions thereof, Lewis acids or bases. Specific examples include compositions comprising boron trifluoride, such as the etherates or amine adducts thereof (for instance the adduct of boron trifluoride and ethylamine), particularly where epoxy resin precursors are used in conjunction with the aforementioned amine curing agents.

In yet another embodiment, the second binding material includes a polyhydroxyether or "phenoxy" resin. During the manufacturing of the dry tape, the second binding material may be applied as a liquid binder composition that is based on a water-borne dispersion containing: (i) a phenoxy resin; and (ii) optionally, a cross-linker. Thus, the manufactured tape may contain a non-crosslinked, partially or fully crosslinked phenoxy resin.

The poly(hydroxyether) resin has the general formula:

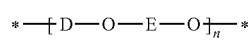

wherein D is the radical residuum of a dihydric phenol, E is a hydroxyl-containing radical residuum of an epoxide and n represents the degree of polymerization and is at least 30 and is preferably 80 or more. The term "thermoplastic poly (hydroxyether)" is intended to include mixtures of at least two thermoplastic poly (hydroxyethers).

The dihydric phenol contributing the phenol radical residuum, D, may be either a dihydric mononuclear or a dihydric polynuclear phenol such as those having the general formula:

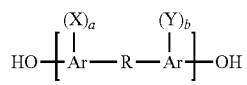

wherein Ar is an aromatic divalent hydrocarbon such as naphthylene and, preferably, phenylene, X and Y which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, a and b are integers having a value from 0 to a maximum value corresponding to the number of hydrogen atoms on the aromatic radical (Ar) which can be replaced by substituents and R is a bond between adjacent carbon atoms as in dihydroxydiphenyl or is a divalent radical including, for example,

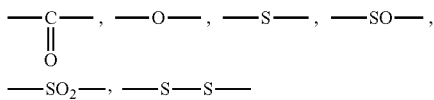

and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or R can be polyalkoxy, or polysiloxy, or two or more alkylidene radicals separated by an aromatic ring, a tertiary amino group, an ether linkage, a carbonyl group or a sulfur-containing group such as sulfoxide, and the like.

Examples of specific dihydric polynuclear phenols include, among others:

bis(hydroxyphenyl) alkanes such as 2,2-bis-(4-hydroxyphenol)propane, 2,4'-dihydroxydiphenylmethane, bis(2-hydroxyphenyl)methane, bis(4-hydroxyphenyl)methane, bis (4-hydroxy-2,6-dimethyl-3-methoxyphenyl)methane, 1,1-bis(4-hydroxyphenyl ethane, 1,2-bis(4-hydroxyphenyl)-ethane, 1,1-bis(4-hydroxy-2-chlorophenyl)ethane, 1,1-bis-(3-methyl-4-hydroxyphenyl)ethane, 1,3-bis(3-methyl-4-hydroxyphenyl)propane, 2,2-bis(3-phenyl-4-hydroxyphenyl)-propane, 2,2-bis(3-isopropyl-4-hydroxyphenyl)propane, 2,2-bis(2-isopropyl-4-hydroxyphenyl)propane, 2,2-bis-(4-hydroxylnaphthyl) propane, 2,2-bis(4-hydroxyphenyl)-pentane, 3,3-bis(4-hydroxyphenyl)pentane, 2,2-bis(4-hydroxyphenyl)heptane, bis(4-hydroxyphenyl)phenylmethane, bis(4-hydroxyphenyl) cyclohexylmethane, 1,2-bis(4-hydroxy-phenyl-1,2-bis(phenyl)propane, 2,2,-bis(4-hydroxyphenyl)-1-phenyl-propane and the like;

di(hydroxyphenyl)sulfones such as bis(4-hydroxy-phenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like;

di(hydroxyphenyl)ethers such as bis(4-hydroxy-phenyl) ether, the 4,3'-, 4,2'-, 2,2'-, 2,3'-, di-hydroxydiphenyl ethers, 4,4'-dihydroxy-2,6-dimethyldiphenyl ether, bis(4hydroxy-3-isobutylphenyl)ether, bis(4-hydroxy-3-isopropylphenyl) ether, bis(4-hydroxy-3-chlorophenyl)-ether, bis(4-hydroxy-3 flurophenyl)ether, bis(4-hydroxy-3-bromophenyl) ether, bis(4-hydroxynaphthyl)ether, bis(4-hydroxy-3-chloronaphthylether, bis(2-hydroxydiphenyl)-ether, 4,4'-dihydroxy-2,6-dimethoxyphenyl ether, 4,4-dihydroxy-2, 5-diethoxydiphenyl ether, and the like.

Alternative suitable dihydric polynuclear phenols are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3'trimethyl-1-(4-hydroxyphenyl)-6-hydroxyindane, and 2,4-bis(4-hydroxyphenyl)-4-methylpentane, and the like.

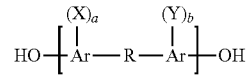

wherein X and Y are as previously defined, a and b have values from 0 to 4, inclusive, and R is a divalent, saturated aliphatic hydrocarbon radical, particularly alkylene and alkylidene radicals, having from 1 to 3 carbon atoms, and cycloalkylene radicals having up to and including 10 carbon atoms.

Mixtures of dihydric phenols may also be used, and whenever the term "dihydric phenol" or "dihydric polynuclear phenol" is used herein, mixtures of these compounds are intended to be included.

The epoxide contributing the hydroxyl containing radical residuum, E, may be monoepoxide or diepoxide. A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., >C—C< and acetylenic unsaturation, i.e., —C≡C—, are preferred. Particularly preferred are halogen substituted saturated monoepoxides, i.e., the epichlohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen carbonyl oxygen and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexyl-methyl)phthalate, 6-methyl-3,4-epoxycyclohexylmethyl-6-methyl-3,4-epoxy-cyclohexane carboxylate, 2-chloro-3,4-epoxycylohexylm-ethyl-2-chloro-3,4-epoxycyclohexane-carboxylate, diglycidyl ether, bis(2,3-epoxycyclopentyl)-ether, 1,5-pentanediol bis(4-methyl-3,4-epoxycyclohexyl-methyl) ether, bis(2,3-epoxy-2-ethylhexyl)adipate, diglycidyl maleate, diglycidyl phthalate, 3-oxa-tetracyclo[4.4.0.17, 10.02,4]-undec-8-yl 2,3-epoxy-propyl ether, bis(2,3-epoxy-cyclopentyl)sulfone, bis(3,4-epoxyhexoxypropyl)sulfone, 2,2'-sulfonyldiethyl, bis(2,3-epoxycyclopentane-carboxylate), 3-oxatetracyclo-[4.4.0.1 7,10.02,4]-undec-8-yl2,3-ep-oxybutyrate, 4-pentenal-di-(6-methyl-3,4-epoxycyclohexyl-methyl) acetal, ethylene glycol bis(9,10-epoxystearate), diglycidyl carbonate, bis(2,3-epoxybutylphenyl)-2-ethyl-hexyl phosphate, diepoxydioxane, butadiene dioxide, and 2,3-dimethyl butadiene dioxide.

Examples of preferred water borne phenoxy resin are condensation polymers derived from bisphenol-A (2,2-bis (p-hydroxyphenyl)propane and epichlorohydrin having the structural formula:

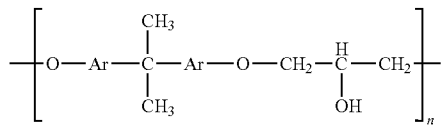

Examples of suitable cross-linkers for phenoxy resins include isocyanates, anhydrides, triazines and melamines.

Suitable crosslinkers include aminoplasts, or amino resin cross-linkers which are the reaction products of either urea or melamine with formaldehyde and an alcohol. Besides urea and melamine, other compounds with similar functionality such as benzoguanamines, glycolurils, cyclic ureas, hydantoins, primary and secondary amides, carbamates etc., may also be used where certain property advantages are required.

The liquid phenoxy-based binder composition discussed above may be applied as a polymer emulsion to coat and infiltrate the fibers in the tape. Water is then evaporated according to a controlled time/temperature profile to achieve the desired physical properties balance. The liquid binder composition is applied so that it penetrates through the structure of the resulting tape.

Figure 2:
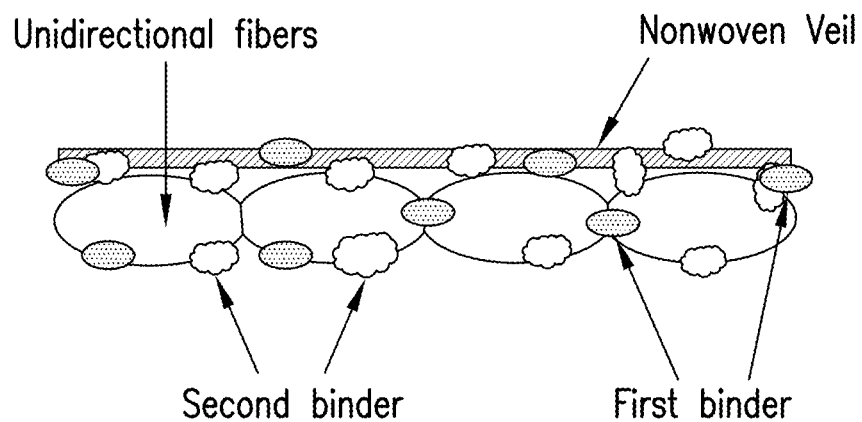
FIG. 2 schematically illustrates a binder-treated unidirectional tape with a single nonwoven veil bonded to one side according to one embodiment of the present disclosure.
Figure 3:
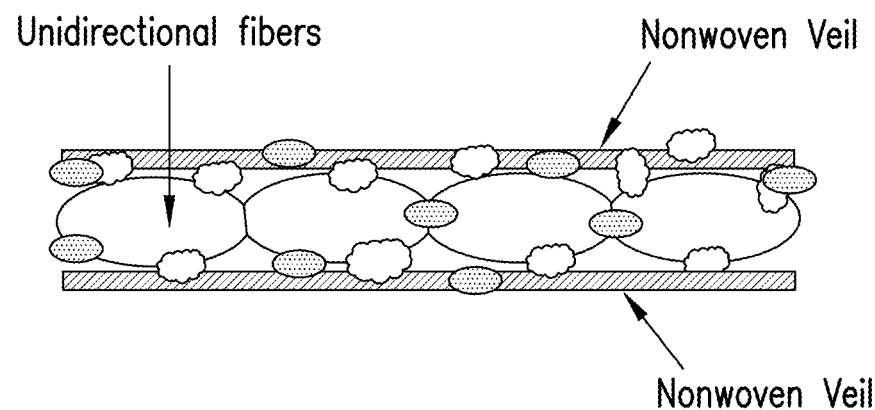
FIG. 3 schematically illustrates a binder-treated unidirectional tape with nonwoven veils bonded to opposite sides according to another embodiment of the present disclosure.

FIG. 2 schematically illustrates a dry tape according to one embodiment of the present disclosure where a single nonwoven veil is bonded to one side of a layer of unidirectional fibers (e.g. carbon fibers). FIG. 3 shows an embodiment in which the unidirectional fibers are sandwiched between two nonwoven veils. The first binding binder remains on the outer surfaces of the tape while second binder penetrates throughout the thickness of the tape. Each binder has specific benefits. The first binder imparts the bonding of the veil to the unidirectional fibers as well as the cohesion and stability of the tape during its manufacture and allows a very good control of the slit tape's width. It also allows an effective lay down process and preform making process by binding the slit tapes to the tool or previously laid down layers.

The second binder holds the unidirectional fiber filaments of the tape to each other. As a result, it improves the abrasion resistance as well as fuzz resistance of the slit tape, which in turn allows for a better control of the slit tape's width. It also increases the stiffness of the slit tape resulting in improved handling during the ATL/AFP lay-down process. And because the filaments are bonded together, the second binding material also contributes to the lower bulk of the dry tape and manufactured preforms.

When the dry tape contain only thermoplastic veils bonded to opposite sides of the layer of unidirectional fibers, without any binding materials, a "spring-back" effect is observed. The dry fiber bed behaves like a spring, and demonstrates thickness relaxation and poor overall preform stability, particularly in the case of a thick layup with thickness greater than 4 mm. This spring-back effect is negated by the presence of the first and second binding materials.

It is also believed that the combination of binders disclosed herein contribute to the low-bulk of the preform formed by laying down the dry tapes because they keep the superimposed layers of the preform bonded together.

The combination of binders disclosed herein help to stabilize the unidirectional structural fibers during the tape laydown process for forming the preform, but does not interfere with the resin infusion process nor the mechanical performance of the final composite part. The nonwoven veil enhances the in-plane resin diffusion during the resin injection cycle. As an additional benefit, the veil, which is located at the interlaminar region between plies of structural fibers and highly loaded with resin, may act as a carrier for materials such as toughening particles or toughening fibers for further toughening of the resulting composite.

The dry flat tape disclosed herein is a self-supporting fibrous material. The term "dry" as used herein refers to a material that may be considered to have a dry feel, which is not tacky to the touch and substantially without any matrix resin aside from the binders disclosed above. The term "self-supporting" refers to a cohesive form of fibers or filaments that do not separate from each other, for example, during the slitting process and other subsequent handlings such as when the fibrous product is processed through automated machines. Furthermore, the dry, binder-treated tape may be stored at room temperature, and does not need to be refrigerated due to the fact that it does not contain substantial amount of a matrix resin, in contrast to prepreg materials.

The unidirectional fibers in the dry tape are high-strength fibers adapted for the structural reinforcement of high-strength composites. To that end, the unidirectional fibers may be made from high-strength materials such as carbon, graphite, glass, and aramid.

The nonwoven veil is a lightweight material that may contain additional binding or toughening agents/particles. The presence of the nonwoven veil improves the in-plane permeability of the tape and favors the in-plane resin flow. Furthermore, the veil provides additional stability to the layer of unidirectional fiber. A further benefit of the veil is that it may be used as a carrier for composite toughening particles, fibers, nanoparticles or other fillers such as intumescents, flame retardants in the interlaminar region.

The binding materials disclosed herein contribute to the low-bulk property of the dry tape. When polymeric nonwoven veils are used, the preferred softening point of the polymer veils and binders is 160° C. or less (as measured by Differentical Scanning calorimetry) in order to allow the tapes to bond and to form a consolidated preform at acceptable machine speeds.

EXAMPLES

Six different types of dry tapes were produced with or without the binders as indicated in Table 1. Each tape had a nonwoven nylon veil of co-polyamide fibers (BR8 from Protechnic, France) bonded to either one or both sides of a layer of unidirectional carbon fibers, wherein the veil had an areal weight of 6 gsm and a melting point of about 155° C. (as measured by Differential Scanning calorimetry using a temperature ramp test from 50° C. to 350° C. with a 5° C./min ramp rate). Binder 1 contained a blend of epoxy resins and PES-PEES copolymer, and if applied, was present on the top and bottom surfaces of the unidirectional fiber layer. Binder 2 contained a copolymer of polyhydroxyether and polyurethane, and if applied, was present throughout the tape. Binder 1 was applied in particulate form and Binder 2 was applied as an emulsion.

TABLE 1

Dry Tapes with Thermoplastic Veils

| Tape ID | Thermoplastic Veil [BR8] | Binder 1 | Binder 2 |
|---|---|---|---|
| 1A | Bottom | No | No |
| 1B | Bottom | Top & Bottom | No |
| 2A | Top & Bottom | No | No |
| 2B | Top & Bottom | No | Yes |
| 3A | Top & Bottom | Top & Bottom | No |
| 3B | Top & Bottom | Top & Bottom | Yes |

Another dry tape structure having a nonwoven carbon veil bonded to unidirectional fibers instead of nylon veil was manufactured. Table 2 summarizes the tape structure. This tape had a nonwoven veil of carbon fibers bonded to one side of the unidirectional carbon fibers and contained both Binders 1 and 2.

TABLE 2

Dry Tape With Carbon Veil

| Tape ID | Carbon Veil | Binder 1 | Binder 2 |
|---|---|---|---|
| 4 | Bottom | Yes | Yes |

Preform stacks of 24 plies with the sequence of [+45/0/−45/90] were built using the dry tapes shown in Table 1 and Table 2. Preform stacks were then vacuum-bagged and exposed for 15 minutes at either 130° C. or 165° C. and for 30 seconds at 165° C. in order to see the effect of the temperature on the preform bulk. The temperatures were selected relative to the melting point of the nylon veil (i.e. 155° C.). Exposure of the tapes for 30 seconds at 165° C. was more in line with the typical ATL/AFP processing conditions. Once the heating cycle was completed, the preforms were cooled under vacuum. Thickness measurements were made with a micrometer and were collected according to a sampling of locations (down-web and cross-web), each location was measured once. The results are summarized in Tables 3A and 3B.

TABLE 3A

Preform Thickness (mm)

| Tape ID | @ 130° C. for 15 min Mean | St Dev | @165° C. for 15 min Mean | St Dev | @165° C. for 30 sec Mean | St Dev |
|---|---|---|---|---|---|---|
| 1A | 4.80 | 0.09 | 4.66 | 0.09 | 4.75 | 0.09 |
| 1B | 4.90 | 0.04 | 4.26 | 0.06 | | |
| 2A | 4.90 | 0.04 | 4.72 | 0.06 | 5.17 | 0.07 |
| 2B | 4.82 | 0.01 | 4.60 | 0.05 | | |
| 3A | 4.81 | 0.08 | 4.40 | 0.04 | 4.85 | 0.12 |
| 3B | 4.85 | 0.08 | 4.50 | 0.05 | 4.62 | 0.04 |
| 4 | 4.72 | 0.03 | 4.74 | 0.05 | 4.76 | 0.04 |

TABLE 3B

| Tape ID | Dry Tape single Ply thickness (microns) RT Conditions Mean | St Dev | Change in Bulk (%) 130° C./15 min | 165° C./15 min | 165° C./30 sec |
|---|---|---|---|---|---|
| 1A | 192.7 | 14.4 | 3.8% | 0.8% | 2.7% |
| 1B | 188.7 | 7.6 | 8.2% | −5.9% | |
| 2A | 196.8 | 12.9 | 3.8% | 0.0% | 9.5% |
| 2B | 216.2 | 10.5 | −7.1% | −11.4% | |
| 3A | 194.6 | 11.3 | 3.0% | −5.8% | 3.9% |
| 3B | 213.0 | 15.7 | −5.1% | −12.0% | −9.6% |
| 4 | 226.8 | 13.5 | −13.3% | −12.9% | −12.5% |

As previously mentioned, the 165° C./30 sec conditions are representative of an automated fiber placement process (AFP), where in particular short exposure of the material to heat is due to the nature of the AFP process, while heat is adjusted to tack the laid down material. Note that the 15-minute heating period is not representative of an AFP process but of a hand lay-up debulk process. Thickness of preform built under these conditions can then be compared to the targeted cure ply thickness (cpt) of a desired composite. Equation 1 below can be used to derive the cpt of a composite provided the composite fiber volume fraction, the fiber density and the fiber areal weight of each ply are known.

$$cpt = \frac{FAW}{Fd \times FVF \times 1000} \qquad \text{Equation 1}$$

where cpt=cure ply thickness (mm)
Fd=Fiber density (g/cm$^3$)
FVF=composite fiber volume fraction
FAW=Fiber areal weight (g/m$^2$)

Table 4 below provides the cpt of each material and the bulk change between the preform stage and the cured composite stage. The fiber density and the fiber areal weight of each material are provided in Table 4 and the cpt was derived according to Equation 1 assuming a fiber volume fraction of 57% which is a realistic target for this type of composite material and this type of composite manufacturing process, i.e. AFP and resin infusion.

TABLE 4

| Material Tape ID | Equivalent preform single ply thickness (microns) @165 C. for 30 sec. Mean | Tape Info: carbon FAW/ CF density | Cpt (mm) calculated at 57% | Bulk Change preform to part (%) |
|---|---|---|---|---|
| 1A | 197.9 | 192/1.78 | 0.189 | −4.39% |
| 1B | | 192/1.78 | 0.189 | |
| 2A | 215.4 | 192/1.78 | 0.189 | −12.15% |
| 2B | | 192/1.78 | 0.189 | |
| 3A | 202.1 | 192/1.78 | 0.189 | −6.36% |
| 3B | 192.5 | 192/1.78 | 0.189 | −1.69% |
| 4 | 198.3 | 194/1.78 | 0.191 | −3.59% |

The last column of Table 4 provides the bulk change from preform stage to cured composite stage and it can be seen that the material based on Tape 2A has the highest level of debulking (12.5%). Tape 2A did not contain Binder 1 or Binder 2. In comparison materials 3B and 4 have the least debulking performance as both were manufactured with tapes containing Binders 1 and 2. Debulking of material 3A is roughly half of material 2A. This was achieved due to the addition of Binder 1 to Tape 2A.

Although material 1A achieved a low debulking performance from preform to composite, this material is in reality not viable as it is not stable and cannot be used in an automated process or even in hand lay-up approach. However, it does highlight the effect on the preform bulk due to using a single thermoplastic veil versus two thermoplastic veils. The material with two thermoplastic veils is processable in an AFP machine but yields a higher bulk than materials that contain both Binders 1 and 2.

As such, the benefits of having Binders 1 and 2 have clearly been demonstrated in these examples. As a rule of thumb, a debulk (i.e reduction in bulk) of up to 10% maximum is accepted to minimize the issues encountered with debulking such as tool design, preform damage and so on. And as the preform thickness grows to a size of 10 mm or even 20 mm—in the above example it was a laminate of about 5 mm—the impact on bulk is becoming even more important and one can expect the difference in thickness between preform and cured composite part to increase, which makes the use of Binders 1 and 2 even more desirable for controlling the preform bulk. For thick composite parts, material 2A would be an unacceptable proposition while materials 3B and 4, which contain both Binders 1 and 2 to maintain a low bulk preform, would be favored.

The invention claimed is:

1. A method of fabricating a composite structure comprising:
   a) applying a liquid binder comprising a first binding material and a second binding material to a fiber web of spread unidirectional fibers, thereby forming a binder-treated fiber web;
   b) drying the binder-treated fiber web;
   c) bonding a nonwoven veil to at least one side of the binder-treated fiber web to form a laminate;
   d) slitting the laminate to form fibrous tapes;
   e) laying down the fibrous tapes by an automated placement process to form a preform having an initial thickness $T_1$;
   f) infusing the preform with a liquid resin in a liquid molding process, thereby forming a resin-infused preform; and
   g) curing the resin-infused preform to form a composite structure with a thickness $T_2$,
   wherein the first binding material is different from the second binding material and is (i) a binder that is a solid at a temperature of up to 50° C., having a softening point at a temperature in the range of 75° C. to 125° C. as measured by Differential Scanning Calorimetry, and comprising a blend of epoxy resin and thermoplastic polymer, but is void of any catalyst or cross-linking agent which is active above 75° C., or (ii) a liquid composition comprising at least one multifunctional epoxy resin; at least one thermoplastic polymer; and at least one surfactant selected from anionic surfactants and nonionic surfactants; and
   wherein the second binding material is a water-borne dispersion comprising at least one of the following:
   (iii) a copolymer of polyhydroxyether and polyurethane, an aminoplast cross-linker; and optionally, a catalyst;
   (iv) a polyurethane, and optionally, a cross-linker;
   (v) an epoxy resin, and optionally, a cross-linker; and
   (vi) a phenoxy resin; and optionally, a crosslinker; and
   wherein the composite structure's thickness $T_2$ is reduced by 0% to 10% of the preform's initial thickness $T_1$ and further consolidation of the preform is not carried out between laying down of the fibrous tapes at e) and infusing the preform at f).

2. The method of claim 1, wherein the nonwoven veil is in the form of randomly-oriented fibers; oriented fibers in a pattern; or a porous membrane.

3. The method of claim 1, wherein the nonwoven veil comprises randomly-oriented carbon fibers, and only one nonwoven veil of carbon fibers is bonded to one side of the binder-treated fiber web.

4. The method of claim 1, wherein each slit tape has a width of 0.1 cm to 61 cm, a length that is at least 10 times its width, and a thickness of 75 μm to 300 μm.

5. The method of claim 1, wherein the total amount of binding materials in each fibrous tape is less than 15% based on the total weight of each fibrous tape.

* * * * *